United States Patent
Liacu

(10) Patent No.: US 10,480,423 B2
(45) Date of Patent: Nov. 19, 2019

(54) TURBOPROPELLER CONTROL SYSTEM WITH CONTROL SATURATION MANAGEMENT

(71) Applicant: Safran Aircraft Engines, Paris (FR)

(72) Inventor: Bogdan Christian Liacu, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 104 days.

(21) Appl. No.: 15/666,441

(22) Filed: Aug. 1, 2017

(65) Prior Publication Data
US 2018/0045123 A1 Feb. 15, 2018

(30) Foreign Application Priority Data
Aug. 12, 2016 (FR) ...................................... 16 57739

(51) Int. Cl.
*F02C 9/58* (2006.01)

(52) U.S. Cl.
CPC ............ *F02C 9/58* (2013.01); *F05D 2220/32* (2013.01); *F05D 2240/35* (2013.01); *F05D 2270/02* (2013.01); *F05D 2270/053* (2013.01)

(58) Field of Classification Search
None
See application file for complete search history.

(56) References Cited

U.S. PATENT DOCUMENTS 3,932,058 A   1/1976   Harner et al.
5,274,558 A  12/1993   High et al.
(Continued)

FOREIGN PATENT DOCUMENTS

CN   201729270 U    2/2011
EP     0392965 A1  10/1990
(Continued)

OTHER PUBLICATIONS

Preliminary Research Report received for French Application No. 1657739, dated Apr. 3, 2017, 3 pages (1 page of French Translation Cover Sheet and 2 pages of original document).
(Continued)

*Primary Examiner* — Lail A Kleinman
(74) *Attorney, Agent, or Firm* — Womble Bond Dickinson (US) LLP

(57) ABSTRACT

A control system (10) of a turbopropeller (1) including: a centralized control (24) configured to slave the screw propeller power PRW of the turbopropeller (1) to the screw propeller power set point $PRW_{ref}$ and the screw propeller rotation speed XNP of the turbopropeller (1) to the screw propeller rotation speed set point $XNP_{ref}$, the centralized control (24) supplying fuel flow rate WF and screw propeller pitch β controls for the turbopropeller (1); a screw propeller rotation speed error limiter (12) saturating the screw propeller rotation speed error ΔXNP with a limiting value $$\Delta XNP_{sat(min/max)};$$

and a screw propeller power error limiter (11) saturating the screw propeller power error ΔPRW with a limiting value $$\Delta PRW_{sat(min/max)}.$$

11 Claims, 7 Drawing Sheets

(56) References Cited

U.S. PATENT DOCUMENTS 9,845,145 B2 * 12/2017 Lu .................. B64C 11/305
2016/0229547 A1 * 8/2016 Fisher .............. B64C 11/305

FOREIGN PATENT DOCUMENTS

| EP | 0392967 A1 | 10/1990 |
| EP | 3002436 A1 | 4/2016 |
| WO | 93/06353 A1 | 4/1993 |

OTHER PUBLICATIONS

GB Search Report for Patent Application No. 1712716.8, dated Jan. 24, 2018, 3 pages.

\* cited by examiner

# TURBOPROPELLER CONTROL SYSTEM WITH CONTROL SATURATION MANAGEMENT

FIELD OF THE INVENTION

The invention relates to the field of turbopropeller control systems.

PRIOR ART

With reference to FIG. 1, a turbopropeller 1 consists of a turbine 2, driving a variable—pitch screw propeller 3 by means of a reduction gear 4.

With reference to FIG. 2, a turbopropeller can be seen as a multivariable system comprising:
two controls:
  the fuel flow rate, which will be denoted WF,
  the screw propeller pitch (also called pitch angle), which will be denoted $\beta$;
two output variables:
  the screw propeller power, which will be denoted PRW,
  the speed of rotation of the screw propeller, which will be denoted XNP.

In the case of a centralized control system 24, the turbopropeller control system 10 comprises a multivariable corrector taking into account the screw propeller power PRW and screw propeller rotation speed XNP outputs to synthesize the fuel flow rate WF and screw propeller pitch $\beta$ controls based on of screw propeller power $PRW_{ref}$ and screw propeller rotation $XNP_{ref}$ set points set by the pilot.

Moreover, there exist, in a turbopropeller, limits on the fuel flow rate WF and screw propeller pitch $\beta$ controls imposed by the operating constraints of the turbopropeller.

In order for the calculated controls to comply with these operating constraints, it is known, as illustrated in FIG. 3, to use a fuel flow rate limiter 311 saturating the fuel flow rate WF control and a screw propeller pitch limiter 312 saturating the screw propeller pitch $\beta$ control.

Yet, as each limiter 311, 312 intervenes on a control independently of the other control, the controls applied are no longer consistent with one another.

FIGS. 4a to 4d illustrate the desynchronization of the controls induced by the limiters 311, 312 in a turbopropeller control system of the prior art. Considerable overshooting of the outputs is observed with respect to the set points.

Solutions have been proposed for correcting the desynchronization of controls saturated by limiters.

One solution consists of adding supplementary states, such as temperature, pressure or altitude, so as to take operating constraints into account at the time of elaboration of the control laws. This first solution is complex to implement.

Another solution consists of recalculating the control not affected by the saturation so as to make it compatible with the saturated control. This second solution is complex to implement and its complexity increases with the number of inputs/outputs.

The prior art solutions for correcting the desynchronization of controls saturated by limiters are therefore not satisfactory.

Presentation of the Invention

One aim of the invention is therefore to propose a control system for a turbopropeller allowing consistent controls to be synthesized, complying with the operating constraints of the turbopropeller.

This aim is achieved in the scope of the present invention thanks to a screw propeller power PRW and a screw propeller rotation speed XNP control system of a turbopropeller based on a screw propeller power set point $PRW_{ref}$ and a screw propeller rotation speed set point $XNP_{ref}$ including:
a centralized control configured to slave the screw propeller power PRW of the turbopropeller to the screw propeller power set point $PRW_{ref}$ and the screw propeller rotation speed XNP of the turbopropeller to the screw propeller rotation speed set point $XNP_{ref}$, the centralized control supplying fuel flow rate WF and screw propeller pitch $\beta$ controls for the turbopropeller;
the control system being characterized in that it includes:
a screw propeller rotation speed error limiter saturating the screw propeller rotation speed error $\Delta XNP$ with a limiting value $$\Delta XNP_{sat(min/max)};$$

a screw propeller power error limiter saturating the screw propeller power error $\Delta PRW$ with a limiting value $$\Delta PRW_{sat(min/max)};$$

the values $$\Delta XNP_{sat(min/max)}$$

and $$\Delta PRW_{sat(min/max)}$$

being selected so that the fuel flow rate WF and screw propeller pitch $\beta$ controls comply with the constraints imposed by operating constraints of the turbopropeller.

The limiting values of the errors $$\Delta PRW_{sat(min/max)}$$

and $$\Delta XNP_{sat(min/max)},$$

i.e. the error limits that can be corrected without violating the operating constraints of the turbopropeller, are calculated before the controls.

The screw propeller power $\Delta PRW$ and screw propeller speed $\Delta XNP$ errors calculated by the control system are then saturated by the limiting values of the errors $$\Delta PRW_{sat(min/max)}$$

and $$\Delta XNP_{sat(min/max)},$$

which makes it possible to guarantee that the synthesized controls will conform to the operating constraints.

The synthesized controls are therefore not saturated, which makes it possible to guarantee the consistency of the controls applied and therefore to avoid overshoots of the outputs with respect to the set points, due to the limiters.

The control system proposed is simple and effective and further has the advantage of being suited to complex systems.

The invention is advantageously completed by the following features, taken individually or in any one of their technically possible combinations.

The limiting value of the power error $$\Delta PRW_{sat(min/max)}$$

is defined as the more constraining limit between:
the limit of the power error $$\Delta PRW_{sat1(min/max)}$$

imposed by the fuel flow rate WF constraints; and
the value of the power error $$\Delta PRW_{sat2(min/max)}$$

in case of saturation of the screw propeller speed error $$\Delta XNP_{sat2(min/max)}.$$

In particular:
when the operating constraint is a maximum, the more constraining limit is defined as the minimum between $\Delta PWR_{sat1(max)}$ and $\Delta PWR_{sat2(max)}$:

$$\Delta PWR_{sat(max)} = \min(\Delta PWR_{sat1(max)}, \Delta PWR_{sat2(max)})$$

when the operating constraint is a minimum, the more constraining limit is defined as the minimum between $\Delta PWR_{sat1(min)}$ and $\Delta PWR_{sat2(min)}$:

$$\Delta PWR_{sat(min)} = \max(\Delta PWR_{sat1(min)}, \Delta PWR_{sat2(min)})$$

The limiting value of the screw propeller speed error $$\Delta XNP_{sat(min/max)}$$

is defined as the more constraining limit between:
the limit of the screw propeller speed error $$\Delta XNP_{sat2(min/max)}$$

imposed by the screw propeller pitch β constraints; and
the value of the screw propeller speed error $$\Delta XNP_{sat1(min/max)}$$

in case of saturation of the power error $$\Delta PRW_{sat1(min/max)}.$$

In particular:
when the operating constraint is a maximum, the more constraining limit is defined as the minimum between $\Delta XNP_{sat1(max)}$ and $\Delta XNP_{sat2(max)}$:

$$\Delta XNP_{sat(max)} = \min(\Delta XNP_{sat1(max)}, \Delta XNP_{sat2(max)})$$

when the operating constraint is a minimum, the more constraining limit is defined as the minimum between $\Delta XNP_{sat1(min)}$ and $\Delta XNP_{sat2(min)}$:

$$\Delta XNP_{sat(min)} = \max(\Delta XNP_{sat1(min)}, \Delta XNP_{sat2(min)})$$

The fuel flow rate WF constraints are a limit of variation of fuel flow rate $$\dot{W}F_{sat(Min/Max)}$$

not to be exceeded.

The screw propeller pitch β constraints are a limit of variation of the screw propeller pitch $$\dot{\beta}_{sat(Min/Max)}$$

not to be exceeded.

When the limits $\dot{W}F_{sat(Max)}$ and $\dot{\beta}_{sat(Max)}$ are maximums:

$$\Delta PWR_{sat(max)} = \min(\Delta PWR_{sat1(max)}, \Delta PWR_{sat2(max)})$$

$$\Delta XNP_{sat(max)} = \min(\Delta XNP_{sat1(max)}, \Delta XNP_{sat2(max)})$$

When the limits $\dot{W}F_{sat(Min)}$ and $\dot{\beta}_{sat(Min)}$ are minimums:

$$\Delta PWR_{sat(min)} = \max(\Delta PWR_{sat1(min)}, \Delta PWR_{sat2(min)})$$

$$\Delta XNP_{sat(min)} = \max(\Delta XNP_{sat1(min)}, \Delta XNP_{sat2(min)})$$

The centralized control is a linear quadratic regulator.

The centralized control is a linear quadratic regulator with integral action.

The invention further proposes a method for controlling the screw propeller power PRW and the screw propeller rotation speed XNP of a turbopropeller based on a screw propeller power set point $PRW_{ref}$, and a screw propeller rotation speed set point $XNP_{ref}$, the method including steps of:

E1 measuring the screw propeller rotation speed XNP at the output of the turbopropeller and estimating the screw propeller power PRW;

E2 calculating the screw propeller power error ΔPRW as the difference between the estimated screw propeller power PRW at the output of the turbopropeller and the screw propeller power set point $PRW_{ref}$, and calculating the screw propeller rotation speed error XNP as the difference between the screw propeller rotation speed XNP measured at the output of the turbopropeller and the screw propeller rotation speed set point $XNP_{ref}$;

E3 calculating limiting values $$\Delta XNP_{sat(min/max)} \text{ and } \Delta PRW_{sat(min/max)},$$

guaranteeing that the fuel flow rate control WF complies with constraints imposed by operating constraints of the turbopropeller;

E4 saturating the screw propeller power error ΔPRW with the limiting value $$\Delta PRW_{sat(min/max)}$$

and the screw propeller rotation speed error ΔXNP by the limiting value $$\Delta XNP_{sat(min/max)};$$

E5 calculating the fuel flow rate WF and screw propeller pitch β controls based on the saturated screw propeller power error ΔPRW and on the saturated screw propeller rotation speed error ΔXNP.

Step E3 includes steps of:

E31: calculating the limits of the power error $$\Delta PRW_{sat1(min/max)}$$

based on a fuel flow rate limit $$\dot{W}F_{sat(Min/Max)}$$

imposed by the operating constraints;

E32: calculating the limit of the screw propeller speed error $$\Delta XNP_{sat1(min/max)}$$

based on the power error limit $$\Delta PRW_{sat1(min/max)}$$

calculated during step E31 and on $$\dot{W}F_{sat(Min/Max)};$$

E33: calculating the limit of the screw propeller speed error $$\Delta XNP_{sat2(min/max)}$$

based on a screw propeller pitch limit $$\dot{\beta}_{sat(min/max)}$$

imposed by the operating constraints;

E34: calculating the limit of the power error $$\Delta PRW_{sat2(min/max)}$$

based on the limit of the screw propeller speed error $$\Delta XNP_{sat2(min/max)}$$

calculated during step E33 and on $$\dot{\beta}_{sat(min/max)};$$

E35: calculating the limiting values $$\Delta XNP_{sat(min/max)} \text{ and } \Delta PRW_{sat(min/max)}, \Delta PRW_{sat(min/max)}$$

being defined as the more constraining limit between $$\Delta PRW_{sat1(min/max)} \text{ and } \Delta PRW_{sat2(min/max)}, \text{ and } \Delta XNP_{sat(min/max)}$$

being defined as the more constraining limit between $$\Delta XNP_{sat2(min/max)} \text{ and } \Delta XNP_{sat1(min/max)}.$$

DESCRIPTION OF THE FIGURES

Other objectives, features and advantages will be revealed by the detailed description that follows with reference to the drawings, provided as illustrations and not limiting, among which.

DETAILED DESCRIPTION OF THE INVENTION

A turbopropeller control system 10 is an onboard computer synthesizing the screw propeller pitch β and fuel flow rate controls for the turbopropeller 1 based on the screw propeller power and screw propeller rotation set points set by the pilot.

Figure 1:
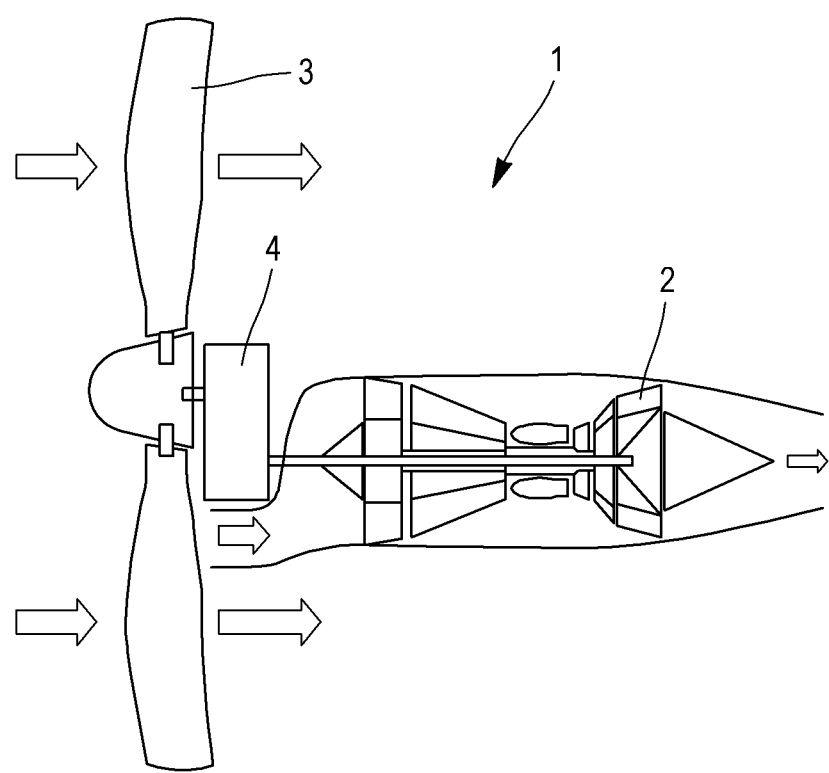
FIG. 1 illustrates a turbopropeller schematically.
Figure 2:
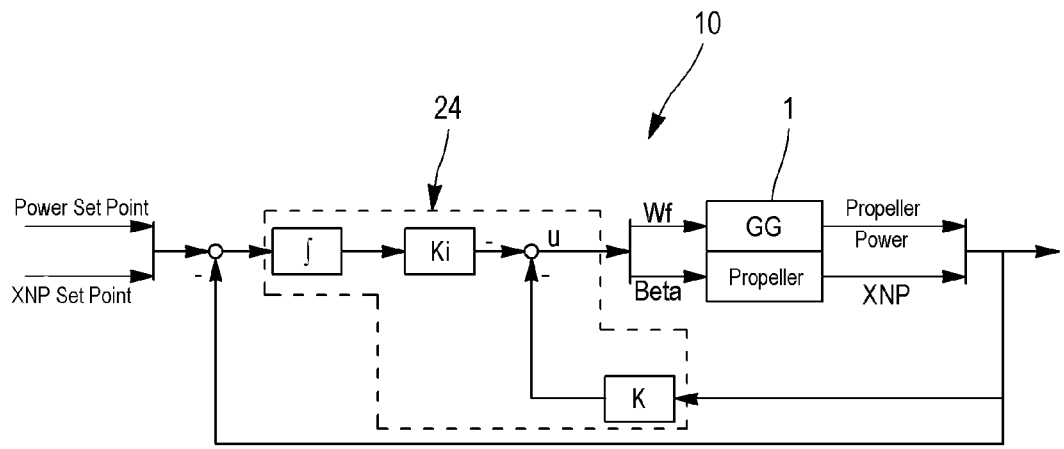
FIG. 2 illustrates schematically a centralized control system of the prior art.
Figure 3:
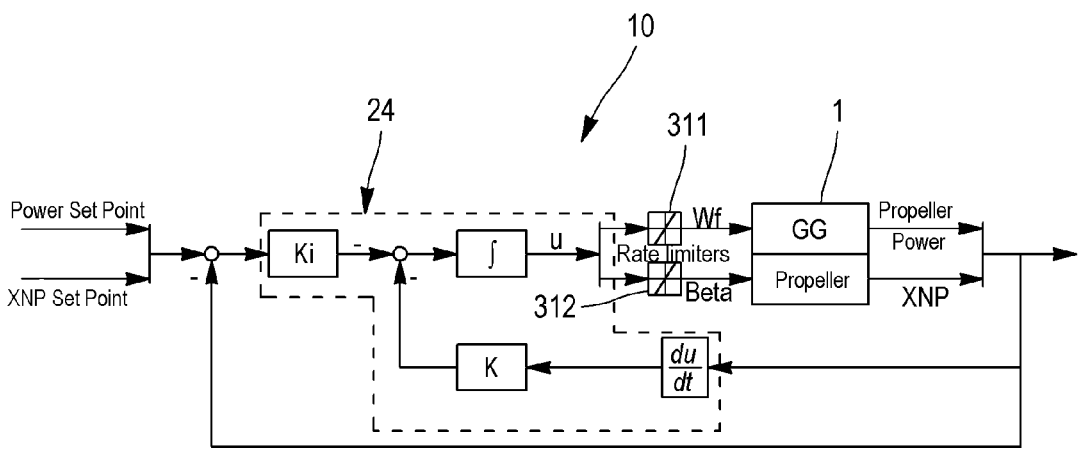
FIG. 3 illustrates schematically a centralized control system with control limiters according to the prior art.
Figure 4A:
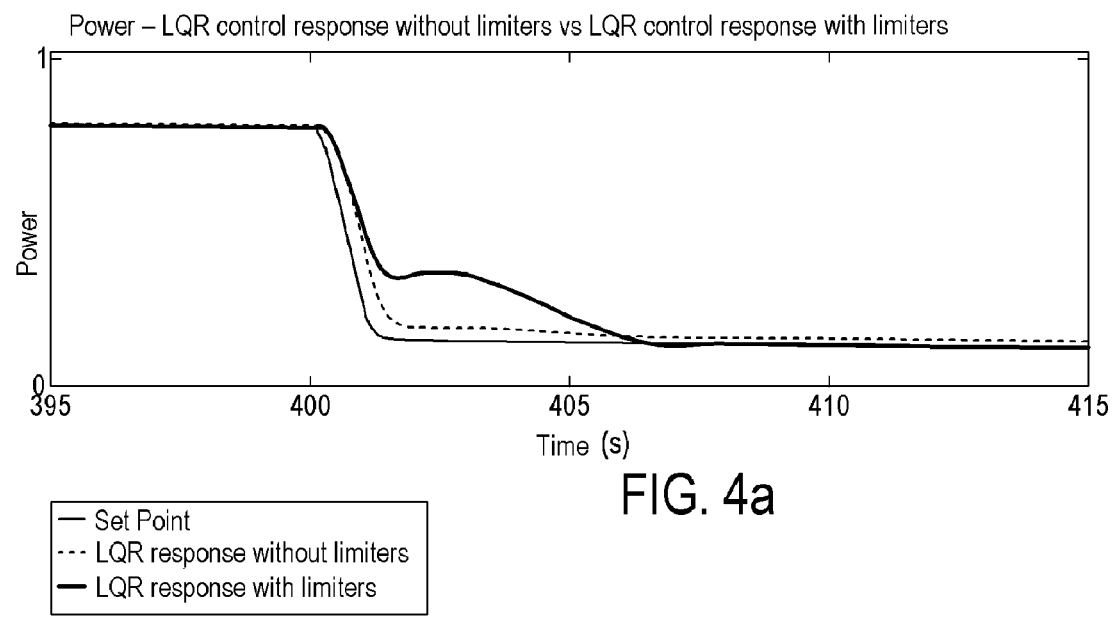
FIGS. 4a through 4d show the set points, the response without a limiter corresponding to the control system of FIG. 2, and the response with a control limiter corresponding to the control system of FIG. 3, for the variables of power (FIG. 4a), screw propeller speed (FIG. 4b), fuel flow rate control (FIG. 4c), and screw propeller angle control (FIG. 4d)
Figure 4B:
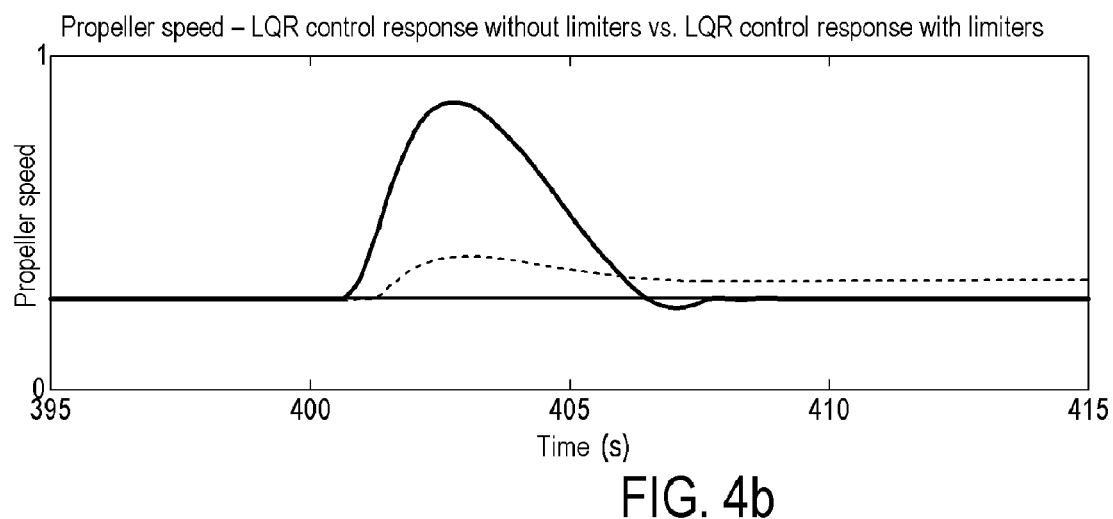
Figure 4C:
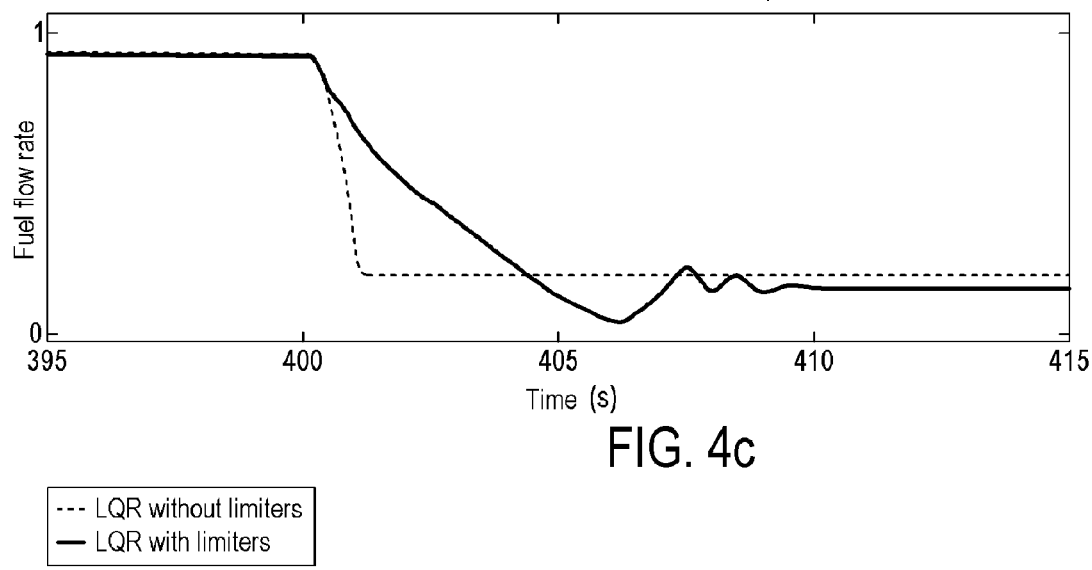
Figure 4D:
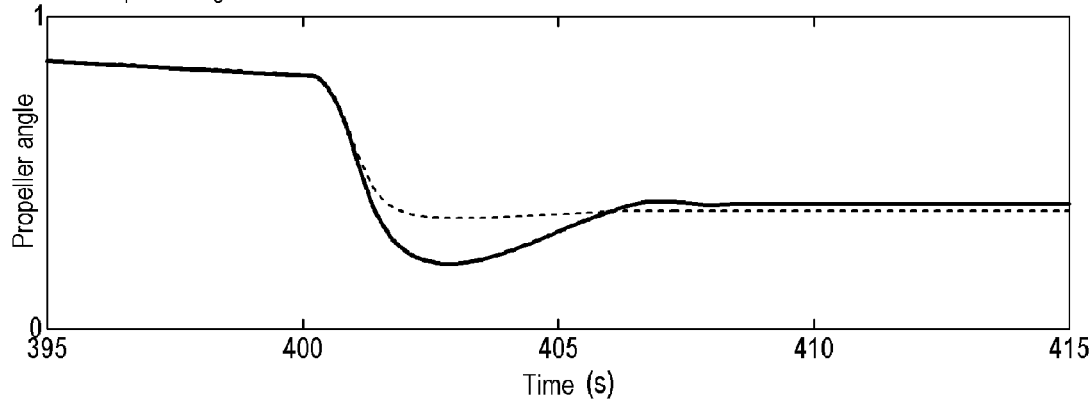
Figure 5:
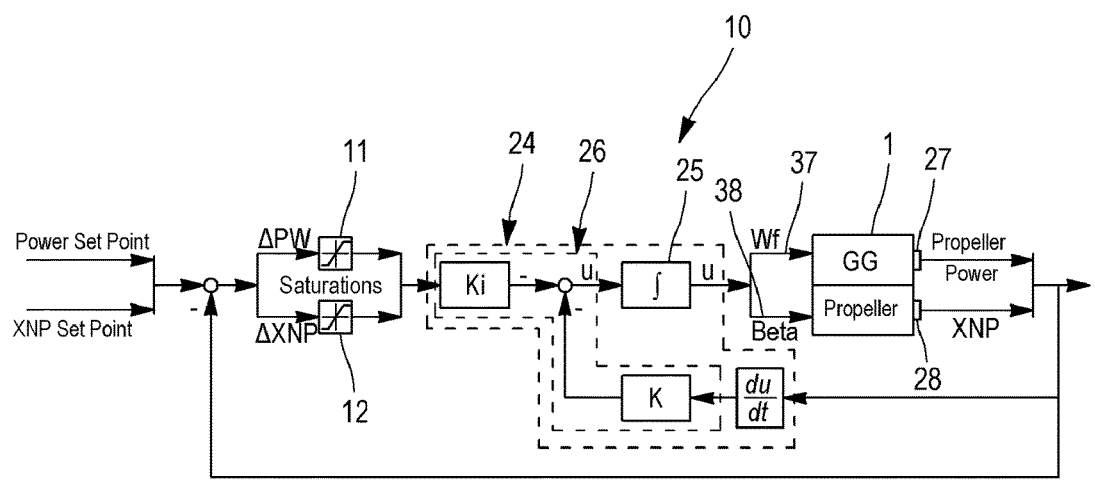
FIG. 5 illustrates schematically an example of a control system according to the invention.
Figure 6A:
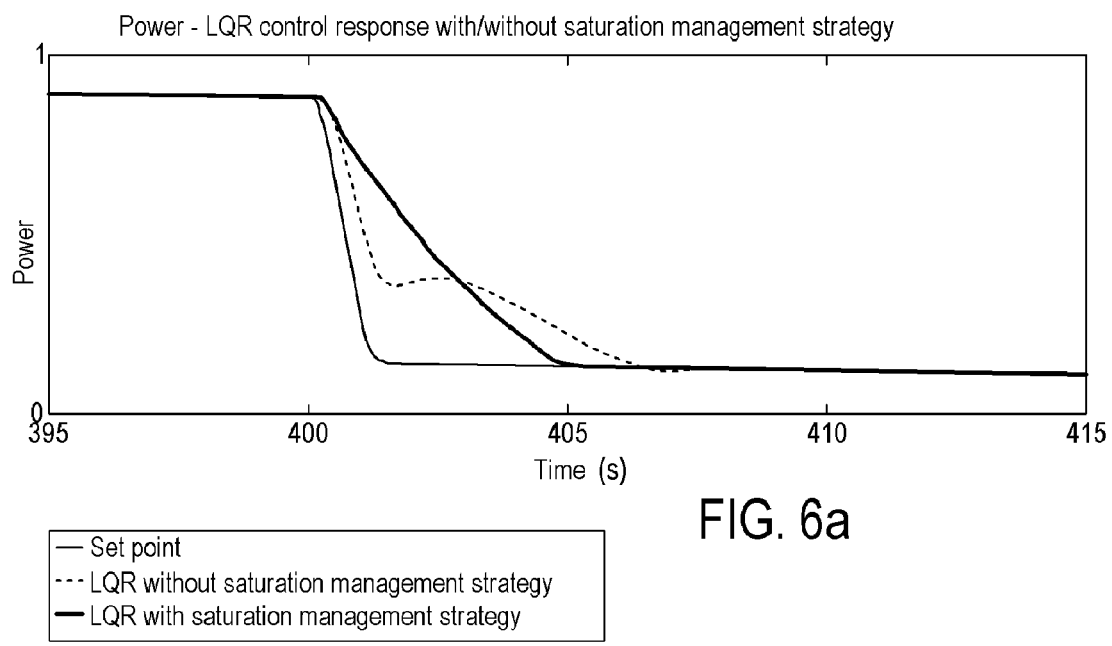
FIGS. 6a to 6d show the set point, the control with a control limiter according to the prior art corresponding to the regulation system of FIG. 3, and the control with error limiter according to the invention corresponding to the control system of FIG. 5, for controlling power (FIGS. 6a and 6c) and for controlling screw propeller speed (FIGS. 6b and 6d), for a system with low operating constraints (6a and 6b), and for a system with high operating constraints (6c and 6d).
Figure 6B:
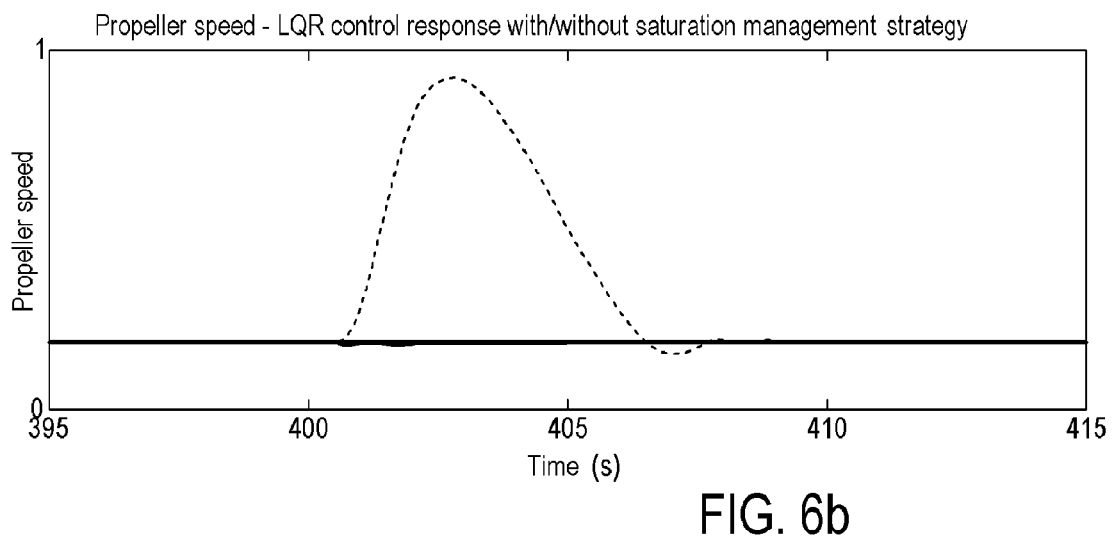
Figure 6C:
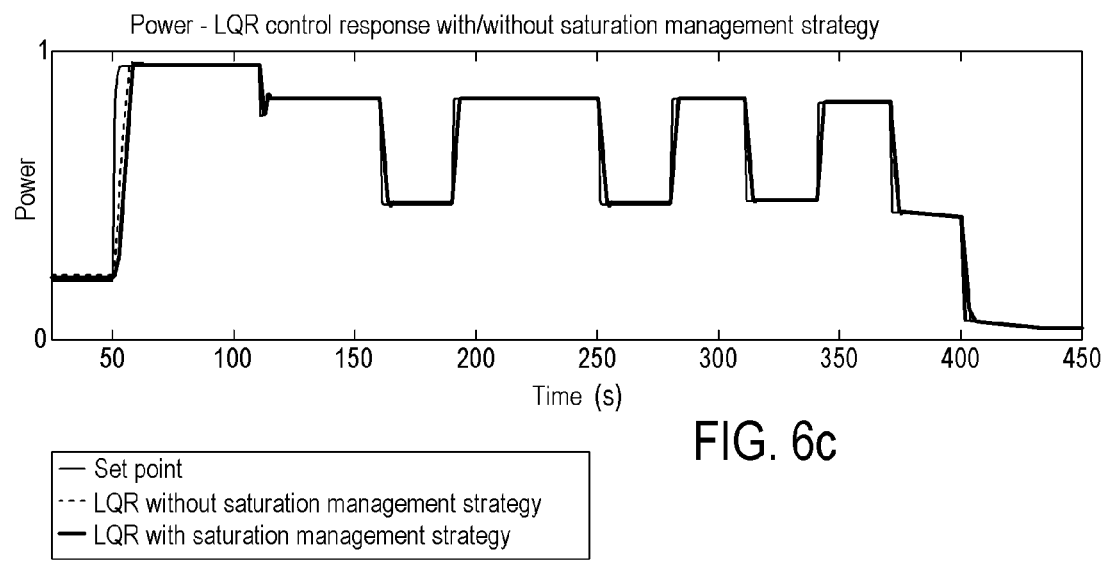
Figure 6D:
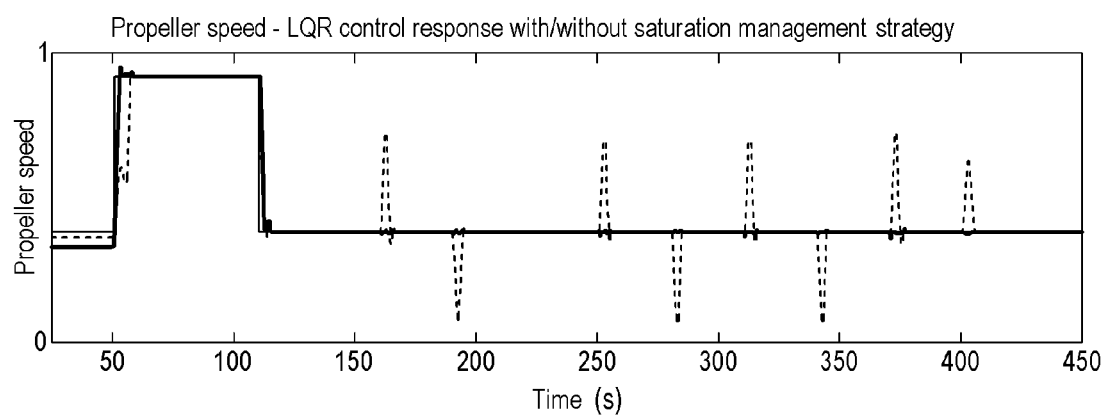

As illustrated in FIG. 5, the control system 10 of a turbopropeller 1 includes:
- a screw propeller torque sensor 27 at the output of the turbopropeller 1;
- a screw propeller rotation speed XNP sensor 28 at the output of the turbopropeller 1;
- a fuel flow rate control 37 of the turbopropeller;
- a screw propeller pitch control 38 of the turbopropeller;
- a centralized control 24 configured to slave:
  - the screw propeller power PRW (calculated as the product of, on the one hand, the torque measured by the sensor 27 and on the other hand the rotation speed measured by the sensor 28) to the screw propeller power set point $PRW_{ref}$ and the screw propeller rotation speed XNP to the screw propeller rotation speed set point $XNP_{ref}$, the centralized control 24 providing the fuel flow rate 37 and screw propeller pitch 38 controls for the turbopropeller 1;
- a screw propeller rotation speed XNP error limiter 11;
- a screw propeller power PRW error limiter 12.

Centralized Control

The centralized control 24 is a feedback loop including a multivariable corrector 26 taking into account the screw propeller power PRW and screw propeller rotation speed XNP outputs to synthesize fuel flow rate 37 and screw propeller pitch 38 controls, without taking the operating constraints into account.

The multivariable corrector 26 is a static multivariable regulator implemented by linear combinations of the screw propeller power PRW and screw propeller rotation speed XNP values.

The multivariable corrector 26 can in particular be a linear quadratic regulator (LQR), as illustrated in FIG. 5.

In order to ensure continuity of control, the centralized control 24 can include a single integrator 25 downstream of the limiters 11 and 12, the multivariable corrector 26 calculating the increments of control. The term used is then LQR regulator with integral feedback.

The centralized control 24 is configured to slave the screw propeller power PRW of the turbopropeller 1 to the screw propeller power set point $PRW_{ref}$ and the screw propeller rotation speed XNP of the turbopropeller 1 to the screw propeller rotation speed set point $XNP_{ref}$.

In the case of an LQR regulator with integral feedback, the equations linking the controls, the output variables and the set points are given below:

$$\begin{cases} \dot{W}F = -KI_{11} \cdot \Delta PRW - KI_{12} \cdot \Delta XNP - KP_{11} \cdot \dot{PRW} - KP_{12} \cdot X\dot{N}P \\ \dot{\beta} = -KI_{21} \cdot \Delta PRW - KI_{22} \cdot \Delta XNP - KP_{21} \cdot \dot{PRW} - KP_{22} \cdot X\dot{N}P \end{cases}$$

The gain matrix of the centralized control 24 is determined by the known method of linear quadratic control, called LQ control.

Limiters

The limiter 11 ensures that the screw propeller rotation speed error ΔXNP, i.e. the difference between the measured screw propeller rotation speed XNP at the output of the turbopropeller and the screw propeller rotation speed set point $XNP_{ref}$ does not exceed a limiting value $$\Delta XNP_{sat(min/max)}.$$

The limiter 12 ensures that the screw propeller power error ΔPRW, i.e. the difference between the screw propeller power PRW at the output of the turbopropeller and the screw propeller power set point $PRW_{ref}$ does not exceed a limiting value $$\Delta PRW_{sat(min/max)}.$$

The limiting values $$\Delta XNP_{sat(min/max)} \text{ and } \Delta PRW_{sat(min/max)}$$

are selected so that the fuel flow rate control WF does not exceed a limiting value of fuel flow rate $$\dot{W}F_{sat(Min/Max)}$$

and so that the screw propeller pitch control does not exceed a limiting value of the screw propeller pitch $$\dot{\beta}_{sat(Min/Max)}.$$

The limits $$\dot{W}F_{sat(Min/Max)} \text{ and } \dot{\beta}_{sat(Min/Max)}$$

are imposed by the operating constraints.

By way of illustration and without limitation, the limit $$\dot{W}F_{sat(Min/Max)}$$

can be imposed by:
- a torque limit applied to the screw propeller shaft, not to be exceeded under penalty of damaging the engine, the maximum torque that can be applied to the screw propeller imposing a maximum fuel flow rate;
- limits on pressure, temperature, turbine engine rotation speed or acceleration imposing fuel flow rate limits.

Temperature and pressure are measured at the inlet of the combustion chamber. For each pressure/temperature pair, there exists a fuel value not to be exceeded so as to protect the engine.

By way of illustration and without limitation, the limit $$\dot{\beta}_{sat(Min/Max)}$$

can be imposed by:
- a speed limit of the screw propeller pitch change,
- a maximum value of the screw propeller speed not to be exceeded.

In practice, the limiters of screw propeller rotation speed error 11 and of screw propeller power error 12 can be feedback loops which run in parallel with the feedback loop of the centralized control.

When the limits $\dot{WF}_{sat(Max)}$ and $\dot{\beta}_{sat(Max)}$ are a maximum, the associated limiting values $\Delta XNP_{sat(Max)}$ and $\Delta PRW_{sat(Max)}$ are maximums. Likewise, when the limit $\dot{WF}_{sat(Min)}$ or $\dot{\beta}_{sat(Min)}$ is a minimum, the associated limiting values $\Delta XNP_{sat(Min)}$ are minimums.

If the limiting value $\Delta XNP_{sat(max)}$ (respectively $\Delta PRW_{sat(max)}$) is a maximum, the limiter saturates the error (i.e., it replaces the value of the error measured by the centralized control with the limiting value) when the measured error is greater than the limiting value $\Delta XNP_{sat(max)}$ (respectively $\Delta PRW_{sat(max)}$).

If the limiting value $\Delta XNP_{sat(min)}$ (respectively $\Delta PRW_{sat(min)}$) is a minimum, the limiter saturates the error (i.e., it replaces the value of the error measured by the centralized control with the limiting value) when the measured error is less than the limiting value $\Delta XNP_{sat(min)}$ (respectively $\Delta PRW_{sat(min)}$)

Turbopropeller Control Method

The control system 10 implements a turbopropeller 1 control method which consists of synthesizing screw propeller pitch and fuel flow rates controls for the turbopropeller 1 based on screw propeller power and screw propeller rotation set points set by the pilot.

The control method includes the following steps:
- E1 measuring (using the sensor 28) the screw propeller rotation speed XNP at the output of the turbopropeller 1 and estimating the screw propeller power PRW (calculated as the product of, on the one hand, the screw propeller torque measured by the torque sensor 27 and, on the other hand, the screw propeller speed measured by the sensor 28);
- E2 calculating the screw propeller power error ΔPRW as the difference between the screw propeller power PRW measured at the output of the turbopropeller and the screw propeller power set point $PRW_{ref}$, and calculating the screw propeller rotation speed error ΔXNP as the difference between the screw propeller rotation speed XNP measured at the output of the turbopropeller and the screw propeller rotation speed set point $XNP_{ref}$;
- E3 calculating limiting values $$\Delta XNP_{sat(min/max)} \text{ and } \Delta PRW_{sat(min/max)},$$

the limiting values $$\Delta XNP_{sat(min/max)} \text{ and } \Delta PRW_{sat(min/max)}$$

being selected so that the fuel flow rate control WF does not exceed a limiting value of fuel flow rate $$\dot{WF}_{sat(Min/Max)}$$

imposed by operating constraints of the engine and so that the screw propeller pitch control β does not exceed a limiting value of the screw propeller pitch $$\dot{\beta}_{sat(Min/Max)}$$

imposed by operating constraints of the engine;
- E4 saturating the screw propeller power error ΔPRW with the limiting value $$\Delta PRW_{sat(min/max)}$$

and of the screw propeller rotation speed error ΔXNP by the limiting value $$\Delta XNP_{sat(min/max)};$$

- E5 calculating fuel flow rate WF and screw propeller pitch β controls based on the saturated screw propeller power error ΔPRW and the saturated screw propeller rotation speed error ΔXNP.

During step E3, the limiting value of the error of each variable is defined, taking into account the effect that saturation of the error would have on the other variable.

To this end, the limiting values $$\Delta XNP_{sat(min/max)} \text{ and } \Delta PRW_{sat(min/max)}$$

are calculated according to the following steps:

Step E31: calculating the allowable limit of the power error $$\Delta PRW_{sat1(min/max)}$$

based on $$\dot{WF}_{sat(Min/Max)}:$$

$$\Delta PRW_{sat1(min/max)} = -\frac{1}{KI_{11}} \cdot \dot{WF}_{sat(min/max)} - \frac{KI_{12}}{KI_{11}} \cdot \Delta XNP - \frac{KP_{11}}{KI_{11}} \cdot \dot{PRW} - \frac{KP_{12}}{KI_{11}} \cdot \dot{XNP}$$

Step E32: calculating the allowable limit of the screw propeller speed error $$\Delta XNP_{sat1(min/max)}$$

based on the allowable limit of the power error $$\Delta PRW_{sat1(min/max)}$$

calculated during step E31 and on $$\dot{WF}_{sat(Min/Max)}:$$

$$\Delta XNP_{sat1(min/max)} = -\frac{1}{KI_{12}} \cdot \dot{WF}_{sat(min/max)} - \frac{KI_{11}}{KI_{12}} \cdot \Delta PRW_{sat1(min/max)} - \frac{KP_{11}}{KI_{12}} \cdot \dot{PRW} - \frac{KP_{12}}{KI_{12}} \cdot X\dot{N}P$$

Step E32 consists of calculating the screw propeller speed error $\Delta XNP_{sat1(min/max)}$ in case of saturation of the power error.

Step E33: calculating the allowable limit of the screw propeller speed error $$\Delta XNP_{sat2(min/max)}$$

based on $$\dot{\beta}_{sat(Min/Max)}:$$

$$\Delta XNP_{sat2(min/max)} = -\frac{1}{KI_{22}} \cdot \dot{\beta}_{sat(min/max)} - \frac{KI_{21}}{KI_{22}} \cdot \Delta PWR - \frac{KP_{21}}{KI_{22}} \cdot \dot{PRW} - \frac{KP_{22}}{KI_{22}} \cdot X\dot{N}P$$

Step E34: calculating the allowable limit of the power error $$\Delta PRW_{sat2(min/max)}$$

based on the allowable limit of the screw propeller speed error $$\Delta XNP_{sat2(min/max)}$$

calculated during step E33 and on $$\dot{\beta}_{sat(min/max)};$$

$$\Delta PRW_{sat2(min/max)} = -\frac{1}{KI_{21}} \cdot \dot{\beta}_{sat(min/max)} - \frac{KI_{22}}{KI_{21}} \cdot \Delta XNP_{sat2(min/max)} - \frac{KP_{21}}{KI_{21}} \cdot \dot{PRW} - \frac{KP_{22}}{KI_{21}} \cdot X\dot{N}P$$

Step E34 consists of calculating the power error $$\Delta PRW_{sat1(min/max)}$$

in case of saturation of the screw propeller speed error.

Step E35: calculating the limiting values of the error of each variable $$\Delta XNP_{sat(min/max)} \text{ and } \Delta PRW_{sat(min/max)}$$

based on the allowable fuel flow rate and screw propeller pitch.

The limiting value of the power error $$\Delta PRW_{sat(min/max)}$$

being defined as the more constraining limit between:
the limit of the power error $$\Delta PRW_{sat1(min/max)}$$

imposed by the limiting value of the fuel flow rate $$\dot{WF}_{sat(Min/Max)}$$

calculated in E31 and;
the value of the power error $$\Delta PRW_{sat2(min/max)}$$

in case of saturation of the screw propeller speed error as calculated in E34.

The limiting value of the screw propeller speed error $$\Delta XNP_{sat(min/max)}$$

is defined as the more constraining limit between:
the limit of the screw propeller speed error $$\Delta XNP_{sat2(min/max)}$$

imposed by the limiting value of the screw propeller pitch $$\dot{\beta}_{sat(min/max)}$$

calculated in E33; and the value of the screw propeller speed error $$\Delta XNP_{sat1(min/max)}$$

in case of saturation of the power error as calculated in E32. In particular:
when the operating constraint is a maximum not to be exceeded:

$$\Delta PWR_{sat(max)}=\min(\Delta PWR_{sat1(max)},\Delta PWR_{sat2(max)})$$

$$\Delta XNP_{sat(max)}=\min(\Delta XNP_{sat1(max)},\Delta XNP_{sat2(max)})$$

when the operating constraint is a minimum not to be exceeded:

$$\Delta PWR_{sat(min)}=\max(\Delta PWR_{sat1(min)},\Delta PWR_{sat2(min)})$$

$$\Delta XNP_{sat(min)}=\max(\Delta XNP_{sat1(min)},\Delta XNP_{sat2(min)})$$

The limiting values $$\Delta PRW_{sat(min/max)} \text{ and } \Delta XNP_{sat(min/max)}$$

are calculated upstream of the controls. The screw propeller power $\Delta PRW$ and screw propeller speed $\Delta XNP$ errors calculated by the control system are then saturated by the limiting values of the errors $$\Delta PRW_{sat(min/max)} \text{ and } \Delta XNP_{sat(min/max)},$$

which makes it possible to guarantee that the controls calculated by the centralized control will conform to the operating constraints. The synthesized controls will therefore not be saturated, which will make it possible to guarantee the consistency of the controls applied and therefore avoid overshoots with respect to the set points.

As illustrated in FIGS. 6a to 6d, the controls in a turbopropeller control system according to the invention do not show considerable overshoots with respect to the set points.

The invention claimed is:

1. A screw propeller power PRW and a screw propeller rotation speed XNP control system of a turbopropeller having a variable pitch screw propeller based on a screw propeller power set point $PRW_{ref}$ and a screw propeller rotation speed set point $XNP_{ref}$, including:
   a centralized control configured to slave the screw propeller power PRW of the turbopropeller to the screw propeller power set point $PRW_{ref}$ and the screw propeller rotation speed XNP of the turbopropeller to the screw propeller rotation speed set point $XNP_{ref}$, the centralized control supplying fuel flow rate WF and screw propeller pitch β controls for the turbopropeller;
   wherein the control system includes:
      a screw propeller rotation speed error limiter saturating the screw propeller rotation speed error $\Delta XNP$ with a limiting value $$\Delta XNP_{sat(min/max)};$$

a screw propeller power error limiter saturating the screw propeller power error $\Delta PRW$ with a limiting value $$\Delta PRW_{sat(min/max)};$$

the values $$\Delta XNP_{sat(min/max)} \text{ and } \Delta PRW_{sat(min/max)}$$

being selected so that the fuel flow rate WF and screw propeller pitch β controls comply with the constraints imposed by operating constraints of the turbopropeller to limit a screw propeller pitch of the variable pitch screw propeller and an amount of torque applied to a screw propeller shaft of the variable pitch screw propeller.

2. The control system of a turbopropeller according to claim 1, wherein the limiting value of the power error $$\Delta PRW_{sat(min/max)}$$

is darned as the more constraining limit between:
   the limit of the power error $$\Delta PRW_{sat1(min/max)}$$

imposed by the fuel flow rate WF constraints; and
   the value of the power error $$\Delta PRW_{sat2(min/max)}$$

in case of saturation of the screw propeller speed error $$\Delta XNP_{sat2(min/max)}.$$

3. The control system of a turbopropeller according to claim 1, wherein the limiting value of the screw propeller speed error $$\Delta XNP_{sat(min/max)};$$

is defined as the more constraining limit between:
   the limit of the screw propeller speed error $$\Delta XNP_{sat2(min/max)}$$

imposed by the screw propeller pitch β constraints; and
   the value of the screw propeller speed error $$\Delta XNP_{sat1(min/max)}$$

in case of saturation of the power error $$\Delta PRW_{sat1(min/max)}.$$

4. The control system of a turbopropeller according to claim 1, wherein the fuel flow rate WF constraints are a limit of variation of fuel flow rate $$\dot{W}F_{sat(Min/Max)}$$

not to be exceeded.

5. The control system of a turbopropeller according to claim 1, wherein the screw propeller pitch β constraints are a limit of variation of the screw propeller pitch $$\dot{\beta}_{sat(Min/Max)}$$

not to be exceeded.

6. The control system of a turbopropeller according to claim 4, wherein when the limits $\dot{W}F_{sat(Max)}$ and $\dot{\beta}_{sat(Max)}$ are maximums:

$$\Delta PWR_{sat(max)} = \min(\Delta PWR_{sat1(max)}, \Delta PWR_{sat2(max)})$$

$$\Delta XNP_{sat(max)} = \min(\Delta XNP_{sat1(max)}, \Delta XNP_{sat2(max)})$$

7. The control system of a turbopropeller according to claim 4, wherein when the limits $\dot{W}F_{sat(Min)}$ and $\dot{\beta}_{sat(Min)}$ are minimums:

$$\Delta PWR_{sat(min)} = \max(\Delta PWR_{sat1(min)}, \Delta PWR_{sat2(min)})$$

$$\Delta XNP_{sat(min)} = \max(\Delta XNP_{sat1(min)}, \Delta XNP_{sat2(min)})$$

8. The control system of a turbopropeller according to claim 1, wherein the centralized control is a linear quadratic regulator.

9. The control system of a turbopropeller according to claim 8, wherein the centralized control is a linear quadratic regulator with integral action.

10. A method for controlling the screw propeller power PRW and the screw propeller rotation speed XNP of a turbopropeller having a variable pitch screw propeller based on a screw propeller power set point $PRW_{ref}$ and a screw propeller rotation speed set point $XNP_{ref}$, the method including steps of:
- E1 measuring the screw propeller rotation speed XNP at the output of the turbopropeller and estimating the screw propeller power PRW;
- E2 calculating the screw propeller power error ΔPRW as the difference between the screw propeller power PRW measured at the output of the turbopropeller and the screw propeller power set point $PRW_{ref}$, and calculating the screw propeller rotation speed error ΔXNP as the difference between the screw propeller rotation speed XNP measured at the output of the turbopropeller and the screw propeller rotation speed set point $XNP_{ref}$;
- E3 calculating limiting values $$\Delta XNP_{sat(min/max)} \text{ and } \Delta PRW_{sat(min/max)}$$

guaranteeing that the fuel flow rate control WF complies with constraints imposed by operating constraints of the turbopropeller, to limit a screw propeller pitch of the variable pitch screw propeller and an amount of torque applied to a screw propeller shaft of the variable pitch screw propeller;
- E4 saturating the screw propeller power error ΔPRW with the limiting value $$\Delta PRW_{sat(min/max)}$$

and the screw propeller rotation speed error ΔXNP by the limiting value $$\Delta XNP_{sat(min/max)};$$

- E5 calculating the fuel flow rate WF and screw propeller pitch controls based on the saturated screw propeller power error ΔPRW and the saturated screw propeller rotation speed error ΔXNP.

11. The control method according to claim 10, wherein step E3 includes steps of:
- E31: calculating the limits of the power error $$\Delta PRW_{sat1(min/max)}$$

based on a fuel flow rate limit $$\dot{W}F_{sat(Min/Max)};$$

imposed by the operating constraints;
- E32: calculating the limit of the screw propeller speed error $$\Delta XNP_{sat1(min/max)}$$

based on the power error limit $$\Delta PRW_{sat1(min/max)}$$

calculated during step E31 and on $$\dot{W}F_{sat(Min/Max)};$$

- E33: calculating the limit of the screw propeller speed error $$\Delta XNP_{sat2(Min/Max)}$$

based on a screw propeller pitch limit $$\dot{\beta}_{sat(min/max)}$$

imposed by the operating constraints;

E34: calculating the limit of the power error $$\Delta PRW_{sat2(min/max)}$$

based on the limit of the screw propeller speed error $$\Delta XNP_{sat2(min/max)}$$

calculated during step E33 and on $$\dot{\beta}_{sat(min/max)};$$

E35: calculating the limiting values $$\Delta XNP_{sat(min/max)} \text{ and}$$

-continued $$\Delta PRW_{sat(min/max)},$$

$$\Delta PRW_{sat(min/max)}$$

being defined as the more constraining limit between $$\Delta PRW_{sat1(min/max)} \text{ and}$$

$$\Delta PRW_{sat2(min/max)},$$

and ΔXNP being defined as the more constraining limit between $$\Delta XNP_{sat2(min/max)} \text{ and}$$

$$\Delta XNP_{sat1(min/max)}.$$

* * * * *